United States Patent [19]
Noirot

[11] Patent Number: 4,594,477
[45] Date of Patent: Jun. 10, 1986

[54] PBX EQUIPMENT WITH DIAL SIGNAL MODIFICATION

[75] Inventor: Tamarra J. Noirot, Boulder, Colo.

[73] Assignee: AT&T Technologies, Inc., Berkeley Heights, N.J.

[21] Appl. No.: 586,926

[22] Filed: Mar. 7, 1984

[51] Int. Cl.[4] .................... H04M 3/42; H04M 7/14; H04M 15/34
[52] U.S. Cl. .................... 179/18 AD; 179/10; 179/18 B; 179/18 EA
[58] Field of Search .......... 179/18 AD, 18 B, 18 BA, 179/18 EA, 8 R, 8 A, 7.1 R, 9, 10

[56] References Cited

U.S. PATENT DOCUMENTS 3,160,713 12/1964 Williford ................. 179/18 BA
4,464,543 8/1984 Kline et al. ................. 179/8 R

OTHER PUBLICATIONS

"GTE Private Interconnect Networks-Systems and Solutions" (3 papers), Nat'l. Telecom. Conf., New Orleans, Nov. 1981 (18 pages).
"Distributed Network Management System", J. D. Miller, *Telecommunications*, Dec. 1981, pp. 33–38.
"Private Networking with SL-1, The International Scene", Basee and Bhatt, *Telesis* (Canada), No. two, 1983, pp. 9–13.

*Primary Examiner*—Thomas W. Brown
*Attorney, Agent, or Firm*—R. F. Kip, Jr.; J. J. Jordan

[57] ABSTRACT

At least three private branch exchange program-controlled telephone equipments (PBX's) in different countries form a system in which the PBX's are interconnectible by direct tie lines, tandem lines or direct distance dialing lines. Each PBX is equipped with the feature of Automatic Route Selection ("ARS") which, when a subscriber at an extension of a one such PBX in one country dials the full string of digits used for an international call to a remote station in another country, selects, out of the tie lines, tandem lines and direct distance dialing lines outgoing from such PBX, an idle one of such lines providing for such call a transmission route yielding the least cost for completing that call. Each such PBX includes the improvement feature of modification of the code signals produced by the dialing of such string of digits to cause outpulsing from such PBX of only those of such signals which are necessary for completion of the call over the transmission route selected therefor by ARS. That feature is realized by holding such code signals, deriving, from stored data relevant to the several transmission routes for calls from such PBX to the remote station, information on the dialed signals which are necessary for completion of the particular call over the particular route selected for it by ARS, and, on the basis of that such information, modifying the held dialed signals to leave only those determined as being necessary for completion of the call over the route selected therefor prior to transmission of such dialed signals over such route.

7 Claims, 2 Drawing Figures

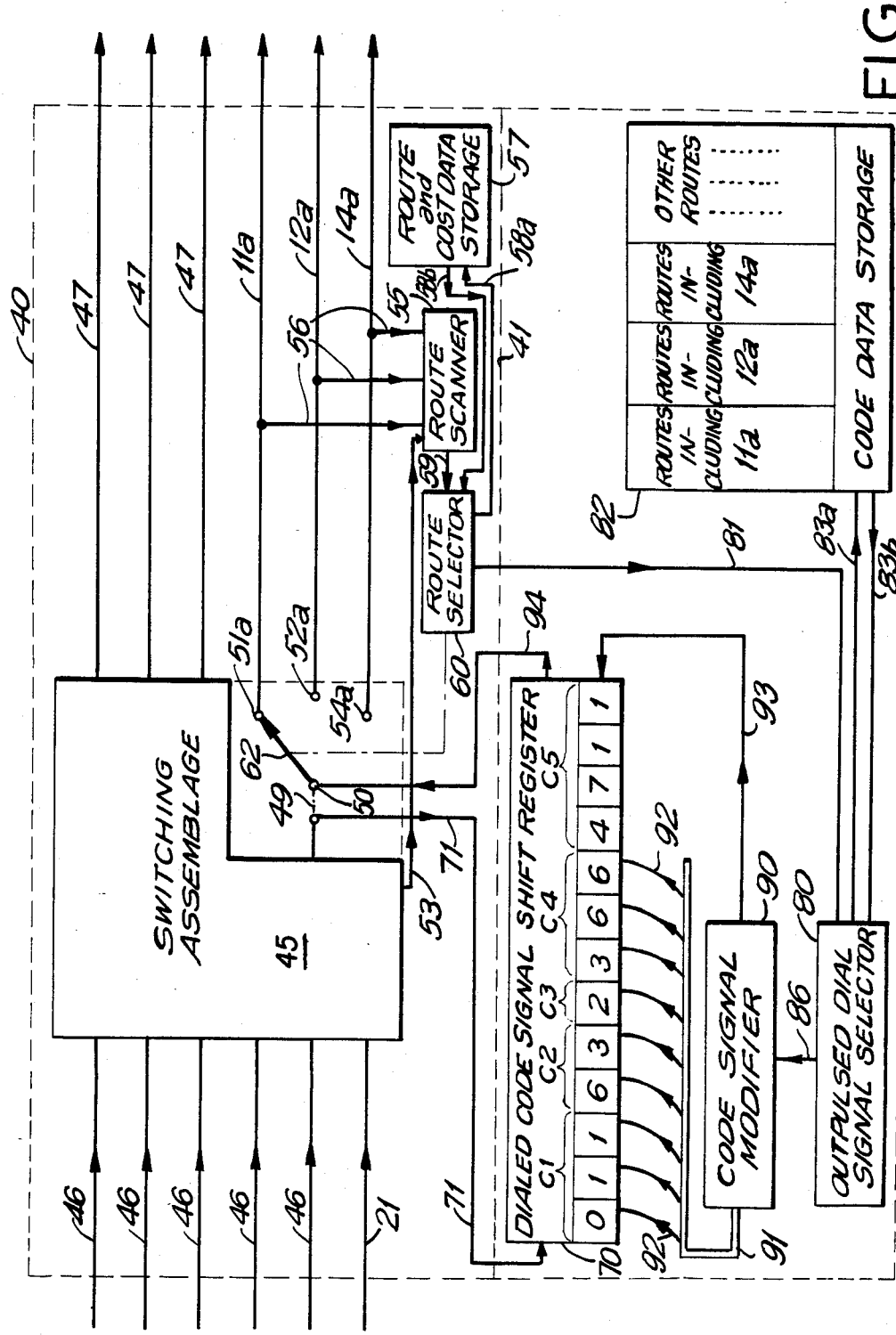

4,594,477

PBX EQUIPMENT WITH DIAL SIGNAL MODIFICATION

TECHNICAL FIELD

This invention relates generally to private branch exchange telephone equipments (PBX's) and, more particularly, to program controlled equipments of such kind adapted, when placing an incoming call, to modify the dialed code signals so as to outpulse only the one or ones of such signals which are necessary to complete the call.

BACKGROUND OF THE INVENTION

A present day program-controlled PBX often has the capability of transmitting a call incoming thereto over one of a plurality of routes to the remote station being called. For example, if a first such PBX is part of a private system of interconnected PBX's of which, say, a second is in the country of the remote station, and a third PBX is in another foreign country but is connected both to the first PBX and the second PBX, then the first PBX is often capable of transmitting the call to the remote station over (a) a direct tie line between the first and second PBX's or (b) tandem lines connecting the first PBX to the third and the third to the second. Further the first PBX also usually has the additional alternative of transmitting the call via direct-digit-dialing lines over a domestic common carrier telephone network and one or more foreign common carrier telephone networks.

Evidently, it is desirable to minimize the cost of making the call and, to this end, models of the Dimension ® PBX available from AT&T Technologies, Inc. (formerly Western Electric Company, Incorporated), 222 Broadway, New York, N.Y. 10038, may be equipped with the feature known as Automatic Route Selection ("ARS") also available from such company. A description of ARS is given in the article "Automatic Route Selection Made Easy" appearing on pages 283–287 of the November 1979 issue of the Bell Laboratories Record. The manner in which such feature operates is that, when a PBX receives an incoming call intended to reach a remote station and the PBX can be connected to such station over each of a plurality of transmission routes, those routes are scanned to determine which of them are idle so as to be available to transmit the call, the group of idle routes is then further examined to determine which one or ones of them permit making the call at least cost, and the call is then directed by the PBX for transmission over a one such route providing the least cost.

When a subscriber at a station served by a local PBX desires to place, say, an international call through it to a remote station in another country, the subscriber usually dials all the digits necessary to complete the call through common carrier telephone networks such as the AT&T network and the network of the common carrier in the country in which the remote station is located. That is, such subscriber would usually dial "011" to indicate that the call is of international character, then two digits identifying the country in which the remote station is located, then possibly another digit identifying the city or the area in which such station is located, and then the local exchange number and individual number of that remote station. It turns out, however, that if the PBX locally serving that subscriber is provided with ARS which will select for the call the least costly available route at the time out of a plurality of potentially available routes so that, depending on circumstances, the call may be directed over any of several of such routes, then, for one or ones of such routes, not all of the digits dialed by the subscriber are necessary for completion of the call to the remote station. On the other hand, to transmit excess dialed digits is evidently inefficient and, therefore disadvantageous.

SUMMARY OF THE INVENTION

That disadvantage is overcome by providing for a program controlled PBX with ARS various functional means which may (but need not be) parts of the PBX implementing the software programs therefor, and which functional means comprise: (a) register means for receiving and holding a string of code signals, dialed as part of an incoming call and corresponding to the codes used to identify the ultimate destination of the call, (b) code data storage means providing, for each of the array of transmission routes which may be used by ARS to complete the call, information as to which if any of such codes need to be used to complete the call over that route, (c) code selector means controlled by such information, and by an indication of the one of such routes actually selected by ARS to determine which of the code signals held in such register means are necessary for completion of the call over such selected route, and (d) means controlled by such determination for modifying in the register means the held code signals so that they correspond only to such necessary codes, and for then effecting transmission of such necessary code signals over the selected route. Such combination of means operates to improve transmissions efficiency by transmitting only those code signals which are required in order to complete the call over the particular transmission route selected.

BRIEF DESCRIPTION OF DRAWINGS

For a better understanding of the invention, reference is made to the following description of a representative mode of implementing it, and to the accompanying drawings wherein:

FIG. 2 is a schematic block diagram of functional means within one of the PBX's of FIG. 1 for realizing the invention.

DETAILED DESCRIPTION

Figure 1:
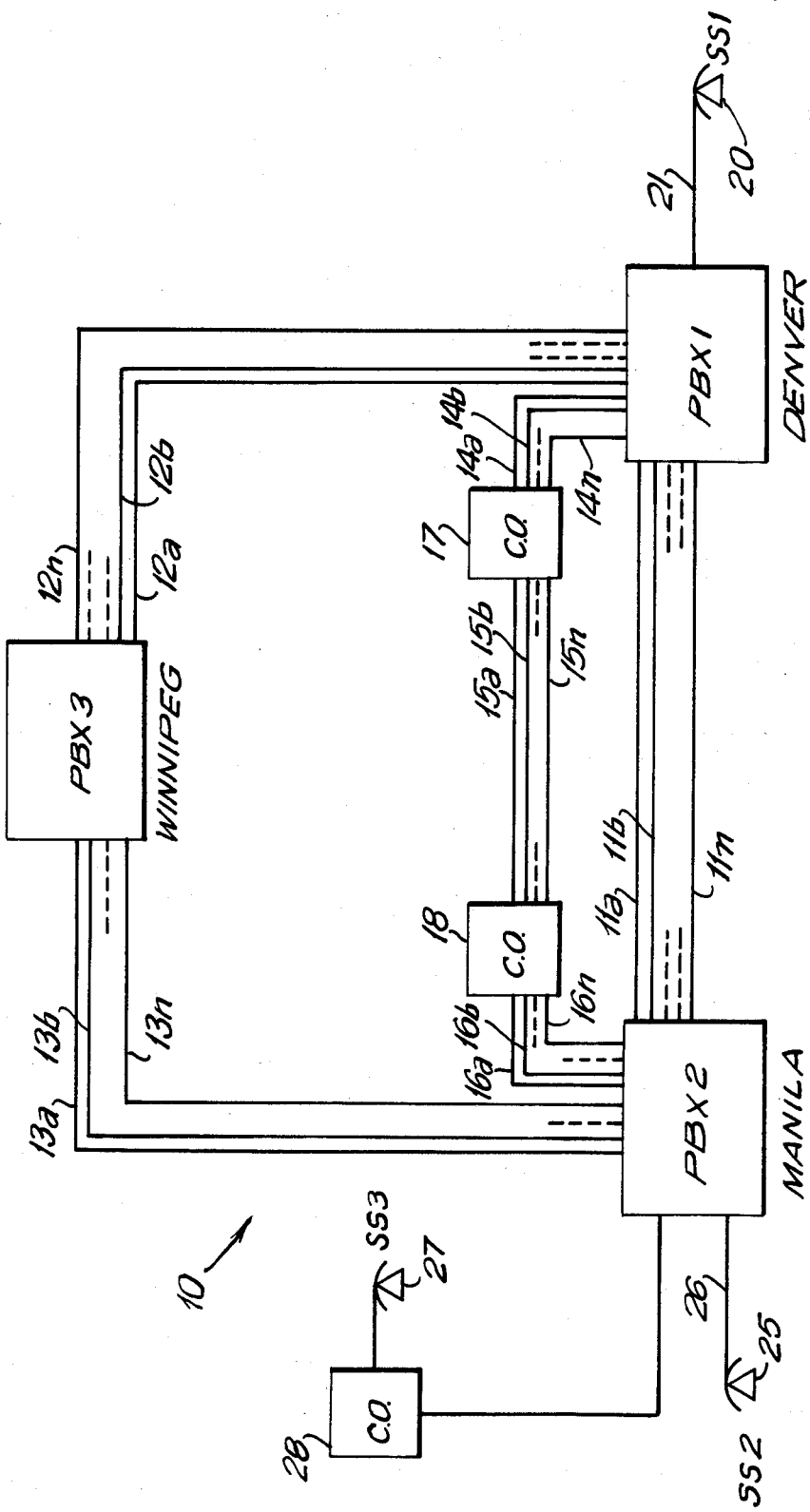
FIG. 1 is a schematic block diagram of a system of PBX's adapted to utilize the invention.

FIG. 1 represents an exemplary custom switching system 10 comprising three Dimension ® PBX switching nodes, PBX1 located in Denver, PBX2 in Manila, Phillipines and PBX3 in Winnipeg, Canada. All three PBX's are interconnected with each other by direct tie trunks 11a, 11b . . . 11n and by tandem trunks 12a, 12b . . . 12n, and 13a, 13b . . . 13n which switch within the customer's system and also by direct-distance-dialing (DDD) lines 14a, 14b . . . 14n; 15a, 15b . . . 15n and 16a, 16b . . . 16n provided by telephone companies. Each of the PBX's are program controlled and each program comprises an "Automatic Route Selection" subroutine which attempts to place a call on the least expensive facility (tie trunks and then tandem trunks) before using the more expensive DDD facilities to complete the call. Such DDD facilities may be, for example, a domestic common carrier network (such as the AT&T network) to which PBX1 is connected through central office 17, a foreign common carrier network (i.e., the Phillipines common carrier network) to which PBX2 is connected through central office 18, and overseas telecommunications links 15 between the two networks.

Assuming first that user SS1 located in Denver at a local station 20 privately wired via line 21 to PBX1 wishes to call user SS2 who is at a remote station 25 located in the Phillipines and connectible via private line 26 to PBX2 in Manila, and that SS1 dials the appropriate digits to identify the called party's (SS2) number. Typically the dialed number will include digits to identify that the call is an international call and digits identifying the PBX and subscriber i.e.,

| 011 | + | 63 | + | 2 | + | 366 | + | 4711 |
|-----|---|------|---|--------|---|---------|---|------------|
| (Int) | | (Phil) | | (Manila) | | (Local Exchange) | | (Individual Number) |

As user SS1 dials the digits they are collected and translated in PBX #1. When sufficient digits are dialed to indicate the call is an international call to the Phillipines, the program stored in PBX1 translates the digits to search for a stored routing pattern and sees here that the customer has three routes to select from: (1) tie trunks 11, (2) tandem trunks 12, 13 and (3) DDD lines 14, 15, 16. The program will attempt to place the call first on the least expensive idle facility, namely one of the lines of the tie trunks. If no tie trunks are available, a line of one of the tandem trunks will be selected and if no tandem trunks are idle then DDD network will be used. If an idle tie trunk line is selected and subscriber SS2 is, as described, at an extension directly connected to PBX2 identified by the number "366" then only the individual code number "4711" is needed by PBX2 to complete the call.

Assume now that, instead of calling a station privately wired to PBX2, SS1 dials a station 27 which is serviced by a central office 28 in Manila and for which, in making a conventional international call, the digits required to be dialed to reach that station would be 011+63+2+972+7801. In this instance, PBX1 would outpulse the digits 972-7801 to PBX2 since these are the only digits needed by PBX2 to complete the call using local telephone company facilities.

Returning to a call from SS1 to SS2, when all the tie trunks are busy, PBX1 will attempt to complete the call to SS2 via tandem trunks to PBX3 in Winnipeg and from there to PBX2. In this instance PBX1 will outpulse all of the digits dialed by SS1 to PBX3 via tandem trunk 12. PBX3 will have selected an idle tandem trunk 13 to Manila PBX2 and will outpulse only those digits required to complete the call, namely 366-4711, to the PBX2 extension 25. If all the tie trunks or tandem trunks are busy, PBX1 will select a DDD route to complete the call and will outpulse the full complement of digits 011-63-2-366-4711.

For a better understanding of how the PBX equipments of the FIG. 1 system are adapted to delete digits unnecessary to complete an international call from the full international call string of dialed digits, reference is now made to FIG. 2 which is a schematic block diagram representation of the PBX1 shown in FIG. 1. In such connection, it is to be understood that the various blocks shown in FIG. 2 represent various means in PBX1 for performing functions to be described, and that such various means may (but need not) be provided in PBX1 by its general purpose circuitry together with appropriate software which modifies such general purpose circuitry to render it specialized to perform such functions.

In FIG. 2, the dashed line rectangle 40 represents PBX1 as a whole, and it will be seen that such rectangle is divided by a dash line 41 into top and bottom halves. The blocks within the top half are illustrative of a known PBX with ARS, while the blocks within the bottom half are illustrative of an improvement to such PBX in accordance with the present invention.

In the top half of rectangle 40, PBX1 comprises a switching assemblage 45 adapted to receive calls over line 21 from station 20 (FIG. 1) and other calls over lines 46 from other local stations (not shown) privately wired to PBX1 to be extensions thereof. Assemblage 45 is adapted in a well known manner to switch a call incoming on any of lines 21, 46 to any of a plurality of lines shown in FIG. 2 as outgoing from PBX1, and which may be direct tie lines to one or more other PBX's in the same system, tandem lines to such one or more other PBX's, or direct-distance-dialing lines. In FIG. 2, the ones of such outgoing lines which are shown are lines 11a, 12a, 14a of FIG. 1, together with other lines 47 of which each may of any of the types just mentioned.

ARS is implemented by PBX1 in a manner of which a simplified explanation is as follows: An incoming call on, say, line 21 to assemblage 45 is directed by that assemblage via a signal path 49 to a circuit point 50 associated with terminations of an array of outgoing lines providing alternative tranmission routes for such call from the PBX to the station being called. Assuming that the call on line 21 is one intended to reach station 25 (FIG. 1), illustrative ones of such lines are the lines 11a, 12a and 14a having respective terminations 51a, 52a and 54a. Of course, in practice, an array of lines much greater than three in number will ordinarily be associated with point 50 for possible transmission of the call over such lines. Moreover, in practice, to each such line in such array, there may correspond a plurality of different overall transmission routes for completion of the call between the calling station and the station being called, the line being only a part of each such route, and such different overall routes including as parts thereof the various possible connections usable to complete the call between the last PBX relaying the call and the station being called.

The dialed signals received by assemblage 45 are translated therewithin into an indication of the pattern of routes which may be available for transmission of the call to the station being called (i.e., the routes corresponding to lines 11a, 12a, 14a), and such indication is supplied via signal path 53 to a route scanner means 55. Responsively the idle or busy condition of each lines 11, 12a and 14a is searched by route scanner means 55 which receives information on that condition of each line via signal paths 56. As will be evident from FIG. 1, the directing of the call over line 11a, 12a or 14a will result in different transmission routes for the call to station 25, and there will be different costs for completing the call over the different routes corresponding to these lines. Information on such routes and the different costs therefor is provided by memory means 57 which stores therein data on such routes and costs.

From the information fed to it by signal paths 56, scanner means 53 determines which of the lines in the mentioned array thereof is busy and which is idle, and such means then relays that information via signal path 59 to a route selector means 60 which commands, via a signal path 58a, the memory means 57 to return back to means 60 via signal path 58b information on the various different possible routes corresponding to such idle lines and the costs of using such routes. Selector means 60 responds to that information received on paths 58b and 59 to connect circuit point 50 to that one (or a one) line of the array which is both idle and will provide a least cost route of transmission for the call. In FIG. 2, such line is illustratively shown as being the line 11a, and the connection thereto of point 50 is illustratively depicted as being made by a movable switch contact 62 permanently coupled to point 50 and mechanically actuable by the selector means to close with any selected one of fixed switch contacts providing the terminations 51a, 52a, 54a of the lines 11a, 12a, 14a. In practice however, selector means 60 preferably operates in an electronic manner to make connection between circuit point 50 and the termination of the idle line providing the least cost transmission route for the call.

Coming now to the improvement in the described PBX with ARS, the bottom half of rectangle 40 shows, as stated, the various functional means for effecting such improvement. Among these means is a shift register means 70 which can be considered as replacing the signal path 49 in the sense that, when the subscriber SS1 indicates his international call to subscriber SS2, the signals corresponding to the digits dialed as part of the call are directed by switching assemblage 45 via signal path 71 to register means 70 to be temporarily held therein. Within the register means such signals are digital in the sense of having "1" or "0" values and are subdivisible into a string of sequential code signals occupying assigned positions in the register means of which each position is specifically associated with a particular numerical dial code used for purposes of identifying the destination intended for the call. Thus, to use the example given before that the digits dialed by SS1 are 011+63+2+366+4711, the whole string of those digits is represented by five code signals which are held in register means 70 and respectively correspond to five numerical dial codes C1, C2, C3, C4, C5 associated (as shown) with specified sequential positions in the register means for storing and holding digital signals. As is evident, a code signal may consist of a plurality of digital "1" or "0" signals spread over a plurality of stages of the register means. Thus, in the present example, the code signal corresponding to the code C1 consists of all signals stored in register means 70 and produced to represent digitally the number "011" which is first dialed in placing the discussed international call. Of course, such digital signals representing "011" may occupy a substantially greater number of register stages than the three sequential positions of register means 70 shown in FIG. 2 as corresponding to code C1 and the number "011".

The mentioned "C" codes constitute classifications of code signals which, as a function of the code in which such signals are classified (in turn indicated by the position occupied by the signal in register means 70) and the dialed number represented thereby, provide information identifying the station intended to be reached by the call and how that station may be reached. Thus, as will be evident from the foregoing description of FIG. 1, those code signals which belong, respectively, to codes C1, C2, C3, C4 and C5 serve to identify, respectively, the international character of the call, the country and the city (if needed) of the remote station being called, and the local exchange number and individual number of that station.

As earlier discussed, some of the code signals produced by the dialing by SS1 of the full complement of digits for an international call may, in dependence on the route selected for transmission of the call be unnecessary in order to complete the call. The determination of which, if any, of such code signals is superfluous is effected as follows.

An outpulsed dial signal selector means 80 receives via a signal path 81 from route selector means 60 information as to the route selected for transmission of any particular call. To the end of supplementing such information, a memory means 82 stores, for each such route which may be so selected, data relevant to determining what code signals are necessary to complete the call over that route. In response to a command given by means 80 over signal path 83a to means 82, information derived from such data is supplied from memory means 82 to selector means 80 over signal path 83b.

Selector means 80 responds to the information provided to it over signal paths 81 and 83b and 85 to provide over signal path 86 to code signal modifier means 90 indications of those code signal which are necessary and (if any) unnecessary for completion of the call over the transmisson route selected for it. Modifier means 90 in turn responds to such indications to produce signals, which are sent out over bus 91 and signal paths 92 leading from such bus to the various positions of register means 70 which can be occupied by the code signals, and which signals modifications, as appropriate, of the code signals in the register means 80 so as to leave in it only those code signals which are necessary to complete the call over the particular transmission route selected therefor. After such modification has been effected, modifier means 40 sends a further signal over path 93 to register means 70 to effect read-out of the string of held necessary code signals from the register means. That string is transmitted via signal path 94 to circuit point 50 to be further transmitted therefrom over the selected line (shown in FIG. 2 as line 11a) and thereafter over the rest of the transmission route selected by ARS for completion of the call.

While the described improvement is shown in FIG. 2 as being incorporated in PBX1, the same improvement is also incorporated in PBX2 (FIG. 1) and PBX3.

Some examples of the operation of the improvement will now be given.

Assume first that the digits dialed in placing the call are those appearing in FIG. 2 within the sequential positions of register means 70 (i.e., are the same as in the first example discussed in connection with FIG. 1), and that ARS has selected for transmission of the call a route provided in part by line 11a. Outpulsed dial signal selector means 80 learns over signal path 81 of that route selection, and means 80 responsively orders over path 83a the code data storage means 82 to supply to means 80 information on what dial codes are necessary to complete the call over line 11a to the station dialed. Means 82 examines the data stored therein for that route and determines from that data that line 11a is a tie line directly connecting PBX1 in Denver to PBX2 in Manila, and that the station dialed is an extension for PBX2 wherefore, of the signals held in register means 70, only those belonging to code C5 are necessary to complete the call. Information to that effect is sent back from storage means 82 via path 83b to selector means 80. Selector means 80 responds to that information to decide that the code signal belonging to all the codes C1, C2, C3 and C4 are unnecessary. That decision is communicated by signal over path 86 to modifier means 90 which responsively clears register means 70 of the signals held therein corresponding to those four codes, so that there is read out from the register means and transmitted over line 11a only the number "4711" which is the individual number for the station 25 intended to be reached by the call.

Assume now that the situation is the same as before except that the last seven digits dialed are 972-7801 to indicate that the call is intended for remote station 27 (FIG. 1) which can be reached from PBX2 only through Manila central office 28. In that instance, the operation will be the same as that described above except that there will be communicated from storage means 82 to selector means 80 the information that the code signal held in the C4 positions of register means 70 does not represent the "366" local exchange number of PBX2. Selector means 80 acts on that information to decide that, in this case, such code signal is necessary for completion of the call and, accordingly, orders modifier means 90 not to clear that code signal from register means 70. As a result, the dial signals outpulsed from the register means and over line 11a will be those representing the dialed digits 972-7801.

As a further example, assume that the dialed digits are again 011+63+2+366+4711 but that, rather than a route provided in part by line 11a, ARS has selected a route provided in part by tandem line 12a for transmission of the call. In such case, the information supplied from storage means 82 via path 83b to selector means 80 will be to the effect that line 12a is a tandem line to PBX3 in Winnipeg, Canada which wll need to receive all the held code signals belonging to codes C1, C2, C3, C4 and C5 in order for PBX3 to forward the call via one of tandem lines 13 to PBX2 by following the same pattern of reaction to dialing signals incoming thereto (as the initial part of a call) as the pattern of reaction followed by PBX1 to dialing signals incoming to PBX1. In this case, therefore, selector means 80 will order modifier means 90 not to delete any of the held code signals from the string of such signals transmitted over line 12a. On the other hand, when such string of signals reaches PBX3, that PBX will respond in the manner discussed above in connection with the first example so that the only code signals sent from PBX3 via a tandem line 13 to PBX2 will be those belonging to code C4 and the last code C5 and corresponding to the dialed digits "366-4711". However, if the last seven digits are 972-7801, PBX2 will send over line 13 those last seven digits.

As will be seen from the foregoing discussion, the described improvement is advantageous in that it is useful not only in a single PBX but also in multiple PBX's interconnected in a system as shown in FIG. 1 by virtue of the fact that it permits each such PBX to modify dial signals so as to outpulse only those necessary to complete the call in a manner which is common to all such PBX's.

As another example, assume that the dialed digits are the same as in the first example discussed, namely 011+63+2+366+4711 but that ARS has selected the direct-distance-dialing route provided by line 14a. In that instance, storage means 82 will supply information to selector means 80 that all the signals held in register means 70 are necessary to complete the call and, as a consequence, means 80 will control modifier means 90 such that the latter will not delete any of such signals.

The modification, according to the improvement, of the held dialed signals is not limited to deletion of one or ones of such signals before outpulsing thereof. Thus, as a further example, assume that subscriber SS1 in Denver (FIG. 1) wishes to place a call through PBX1 to a remote station in a country in Asia other than the Phillipines. In that case, the ARS components of PBX1 determine that the call can be completed at least cost by routing it on a then idle direct tie line from PBX1 to PBX2 in Manila and, from PBX2, via direct distance dialing lines and foreign common carrier networks to such remote station. Accordingly, such ARS components select, as described above, such direct tie line as a link in the overall transmission route from SS1 to such remote station, and information of the overall route selected is supplied via path 81 to outpulsed dial signal selector means 80. When, however, such means 80 interrogates memory means 82 over path 83a regarding that route, the means 82 supplies the information over path 83b back to means 80 that in order to relay the call on from PBX2 over such direct distance dialing lines and foreign network to such remote station, it is necessary that PBX2 outpulse a code signal corresponding to Code C1 which identifies the call as an international one, but which represents, say, the numerical value "123" so as to be different from the "011" value used in the United States to identify international calls. Selector means 80 responds to such information to control modifier means 90 such that the latter sends signals over bus 91, causing the "011" signals originally occupying the C1 positions in register 70 to be replaced by signals representing the number "123" and, these "123" signals will be outpulsed from PBX1 to PBX2 as part of the string of dial code signals transmitted from the former to the latter. In this instance, therefore, there has been a replacement of originally dialed signals by new dial signals rather than a mere deletion of originally dialed signals.

While the above discussion has centered on international calls, the described improvement is evidently not limited to use only with such calls but may be used as well in connection with domestic calls. Thus, assume that PBX2 and stations 25 and 27 (FIG. 1) are located in Houston, Tex. instead of Manila. Then, in the first and second examples given above (in connection with FIG. 2), subscriber SS1 would omit dialing the code signals used in international calls and, instead, would dial only 713-366-4711 and 713-972-7801 ("713" being the Houston area code) in, respectively these two examples. In such case, the first example, the described improvement would operate to delete 713-366 from the held code signals so as to leave for outpulsing from PBX1 only the dialed signals representing "4711" but, in the second example, the improvement would operate to delete only the "713" signals so as to leave for outpulsing the dialed signals representing 972-7801.

Moreover, while the discussion above has disclosed the improvement in terms of modification in their entirety of "code" signals which have been described as corresponding one for one with the various codes used in telecommunications to identify the ultimate destination of the call being placed (i.e., as previously described, there is one such "code" signal corresponding to each such code), it is to be remembered that each such one "code" signal is often made up of a group of dialed signals each representing one of several dialed digits which together form the complete number dialed for the corresponding code. The described improvement also has the capability of modifying an individual one or ones of the dialed signals constituting as a group one code signal while leaving unmodified the other one or ones of the dialed signals in such group. As an example, in cases where the number of PBX's in a privately wired system thereof is less than ten (such as is shown in FIG. 1), and the ARS components of the PBX to which the call is originally incoming have determined that the call will be completed over an intra-system line or lines through another PBX which is in such system and relays the call either to an extension of that PBX or through direct distance dialing lines to the station being called, only one numerical digit is necessary to identify that relaying PBX. In such cases, therefore, although the subscriber originating the call will, in dialing, produce signals representing all three digits of the code used to identify the local exchange number of the station being called, at the PBX to which the call is first incoming, the improvement will operate to delete those of such signals representing the first two of such digits so as to leave for outpulsing from such PBX only the signals representing the last of such digits.

From the foregoing, it will be evident that the improvement hereof is highly flexible in its application and can be described broadly by stating that, when a program-controlled PBX with ARS receives an incoming call for transmission thereby to a remote station (i.e., one not merely an extension of such PBX), once the ARS components of such PBX have selected a route over which such call will be transmitted from such PBX to the station for which such call is intended, then the described improvement provides methods and means for modifying the signals produced by the dialing part of the call such that only the one or ones of such signals necessary for completion of that call over that selected route will be outpulsed by that PBX. Of course, however, the improvement may be practiced in an imperfect manner while still providing an advantage by modifying such signals so to provide for outpulsing of all of them which are such necessary signals, and to also provide for outpulsing of one or ones but not all of such signals which are unnecessary for completion of that call over the selected route. Also, it will be evident that the improvement has applications for program-controlled PBX's not equipped with ARS but which have the capability of forwarding incoming calls thereto over a plurality of transmission routes having different requirements as to the dialed signals of such calls the transmission of which over the route is necessary in order to complete the call.

The above described mode of signal modification being exemplary only, it will be understood that additions thereto, omissions therefrom and modifications thereof can be made without departing from the spirit of the invention and that, accordingly, the invention is not to be considered as limited save as is constant with the recitals of the following claims.

What is claimed is:

1. The improvement in a program-controlled private branch exchange telephone equipment ("PBX") which is adapted to route incoming calls to remote stations over any one of a plurality of lines having terminations at such PBX and providing at least parts of alternative transmission routes for such calls, and which PBX comprises:

switch means responsive to a string of code signals, dialed as part of such a call to such a station and representing respective numbers for a plurality of dial codes respectively associated with specific sequential signal positions in such string and identifying by the corresponding code signals in such positions the ultimate destination of such call, for connecting such string of code signals to a circuit point associated with respective terminations of an array of such lines providing at least parts of alternative transmission routes for such call from said PBX to such station, scanner means for determining which of such routes is available to transmit that call, and route selector means controlled by said scanner means for connecting said point to a selected line included in such array of lines and corresponding to an available one of such routes identified and selected by such selector means as yielding the least cost for transmitting said call;

said improvement comprising: register means for receiving and holding said string of code signals, code data storage means providing, for such routes of which at least parts thereof are provided by said array of lines, information as to which of the said dial codes are necessary to complete such call over respective ones of such routes, outpulsed dial signal selector means responsive to signals representing, respectively, said information and the identity of the selected route provided at least in part by said selected line to determine which of said code signals are necessary for completion of such call over said selected route, and code signal modifying means controlled by said outpulsed dial signal selector means to modify in such register means the held code signals so as to have them correspond only to such necessary dial codes, and for then producing outpulsing of the string of such so-modified code signals from said register means to said circuit point and over said selected line.

2. The improvement according to claim 1 in which said PBX is one of a plurality of program-controlled PBX's interconnected in a privately wired system and each comprising the several means which such one PBX is heretofore described as comprising, and in which the other PBX's in said plurality thereof each includes as an improvement thereto the several means which the said improvement to said one PBX is heretofore described as comprising.

3. The improvement according to claim 1 in which the said PBX (the "first" PBX) is interconnectible with another PBX (the "second" PBX) by at least one direct tie line, and in which, when an incoming call to the first PBX includes among the codes dialed for that call, those digits identifying a local exchange number assigned to the second PBX, and, moreover, said tie line has been selected to provide the part of the transmission route for such call extending from the first to the second PBX, the said improvement in the first PBX is operable to delete from the dialed code signals held thereby all of such signals except for the one thereof representing an individual number of an extension of the first PBX intended to be reached by such call.

4. The improvement according to claim 1 in which the said PBX (the "first" PBX) is interconnectible with another PBX (the "second" PBX) by at least one direct tie line and in which, when an incoming call to the first PBX includes among the codes dialed for that call a local exchange number and an individual number of a remote station connectible to the second PBX only through a common carrier network and, moreover, said tie line has been selected to provide the part of the transmission for such call extending between said first and second PBX's, the said improvement in said first PBX is operable to delete from the dial code signals held by such first PBX all of such signals except those representing such local exchange number and individual number.

5. A method of processing any of a plurality of strings of dial signals respectively representing digits dialed as part of telephone calls which are incoming to a first program-controlled private branch exchange telephone equipment ("PBX") and are destined for remote stations reachable from such first PBX over a plurality of telephone routes including (a) routes provided at least in part by a private telephone network interconnecting said first PBX with one or more additional PBX's and (b) routes provided at least in part by direct distance dialing lines and one or more common carrier telephone networks, said first PBX being operable to select for any of said calls a one of said plurality of routes for transmission of such call to the remote station for which that call is destined, and said method comprising: holding temporarily in said first PBX the string of dial signals received thereby as part of any particular such call incoming to said first PBX, storing in memory means in said first PBX data for each of said plurality of routes the dial signals necessary to complete a call over that route, utilizing an indication of the one of such plurality of routes selected by said first PBX for transmission of said particular call to address said memory means so as to read-out therefrom control signals indicative of which dial signals are necessary for completion of such particular call over such route selected therefor, modifying, when appropriate, individual of said held dial signals so as to produce for said particular call a modified string of held dial signals assuring completion of that call over said route selected therefor, and then outpulsing the string of held dial signals from said first PBX and over such selected route.

6. A method according to claim 5 in which said held dial signals are modified when appropriate by such control signals so that the modified string of held dial signals includes only held dial signals necessary to complete said particular call over said route selected therefor.

7. The improvement in a first program-controlled private branch exchange telephone equipment ("PBX") which is adapted to receive a plurality of incoming calls constituted in part of respective strings of dial signals representing dialed digits identifying the destination station of the calls, and to forward such calls to such stations over a plurality of transmission routes including (a) routes provided at least in part by a private telephone network interconnecting such first PBX with one or more additional PBX's, and (b) routes provided at least in part by direct distance dialing lines and one or more common carrier telephone networks, and which first PBX is further adapted in response to reception of any particular incoming call of said plurality thereof to select a particular one of said plurality of routes for transmission of that call to the destination station therefor, said improvement comprising: means for temporarily holding in said first PBX the string of dialed signals received thereby as part of said particular incoming call, memory means for storing data for each of said plurality of routes on the dialed signals which are necessary to outpulse from said first PBX over that route in order to complete a call over such route, means responsive to selection by said first PBX of a particular one of said plurality of routes for transmission of such particular call from such first PBX to address said memory means so as to read out therefrom control signals indicative of which dial signals are necessary for completion of such particular call over such particular route selected therefor, and means responsive to said control signals for modifying, when appropriate the string of held dial signals received as part of said particular call so as to produce a modified string of held dial signals assuring completion of such particular call over such particular selected route, and means for then outpulsing such held string of dial signals for such particular call from said first PBX and over such particular selected route.

* * * * *